: 2,962,383
Patented Nov. 29, 1960

2,962,383

METALLIC DECORATING OF GLASS

Josef Francl and Joseph S. Logiudice, Toledo, Ohio, assignors to Owens-Illinois Glass Company, a corporation of Ohio No Drawing. Filed Oct. 10, 1955, Ser. No. 539,694

2 Claims. (Cl. 117—37)

This invention relates to an improved method of decorating glassware and more specifically to decorating glass surfaces with metallic markings capable of developing permanent colors on heating. The markings consist of extremely adherent metallic films which are chemically united with the glass structure to furnish decorative and functional indicia such as graduations, lettering, numerals, designs, etc., as durable as the glass itself.

It is necessary that scientific glassware such as thermometers, burettes, graduates, etc., have clearly defined graduations to permit their expeditious and accurate reading. The graduations which are usually colored must present sufficient contrast with the body of the glass article for easy reading and be physically and chemically resistive to withstand repeated subjection to reagents, detergents, and wiping.

Previously the most common methods of decorating glass surfaces have consisted of applying pigmented materials such as applied color lettering paints to smooth areas or roughening the glass surface by acid-etching, cutting or scratching in a desired pattern and filling the recessed areas with a bonding pigmented cement. The paints or cements are normally fired in a decorating lehr to bond them to the glass surface. The principal failings of these decorations have been due to their limited adhesion to the glass resulting in their inability to resist various solutions, repeated cleaning and surface abrasion as well as a weakening of the glass in its roughened areas.

Thus, it is a primary object of this invention to provide a simple method of decorating glass articles with thin metallic markings having lasting durability and permanent colors resistant to most solutions.

Another object of this invention is to provide an improved economical method of decorating glass with firmly adherent metallic films which may be distinctively colored by heating the marked glass to a controlled elevated temperature.

Another object of this invention is to furnish a simple method of placing highly resistant colored indicia on glass with a minimum of apparatus and manual skill.

The specific nature of this invention as well as other objects and advantages thereof will be come apparent to one skilled in the art of decorating glass from the following detailed description.

It has been known for some time that relatively pure metals such as titanium and zirconium have the characteristic property of being able to make a distinct mark on glass. Nearly all glasses are able to be so marked, but the softer varieties such as soda-lime or flint are more easily marked. The marks made by the direct application of these metals to glass are thin films having a silvery, opaque appearance at room temperature.

More recent study and analytical examinations of glass structure have shown that good adhesion of certain other metals to glass could be expected. Metals which have chemical properties of being able to combine with most varieties of glass have polarizable ions of large ionic radius with incomplete electronic shells. These metals lie in the same group of the periodic system as carbon and silicon, being slightly more electropositive with a characteristic valence of four. In their natural occurrence they are frequently combined with silicate rocks which indicates their ready combination with elements of group four of the periodic table. The metallic elements which have been found to make a distinctive mark on glass are members of group of the periodic table. Metals of the follwing group are of this kind: titanium, zirconium, hafnium, thorium, tin and lead.

Before a metallic layer or film is placed on glass its surface must be thoroughly cleaned to obtain good adhesion of the metal. The glass surface to be marked can be conveniently prepared by heating the glass in a gas flame, cleaning with chromic acid or organic solvents. The glass surface may be cleaned in numerous other ways known in the art so as to leave its areas for marking free of foreign matter. In the case of newly manufactured ware the cleaning operation may be omitted and the metallic marks placed on the glass articles shortly after their formation. Placing the metallic marks on clean glass surfaces results in a more adherent film.

The marks are made by the direct application of the metal drawn across the glass leaving a metallic layer or film having silvery, opaque appearance. Any one of the metals of the above group can be employed to mark the glass, all giving somewhat the same initial appearance at atmospheric temperatures. Marking glass with one of these metals can be accomplished quite simply by forming a pencil point or sharpened tip of the metal and drawing the same across the glass surface. Calibration marks, for example, may be placed on glassware simply by drawing a series of metallic marks in a prescribed pattern across the glass surface with the metallic pencil point.

A stylus may be fabricated of one of the metals similar to a wax marking stylus for use on a graduation machine. The stylus then instead of removing portions of the wax prior to etching would eliminate the wax application entirely leaving a metallic deposition on the contacted portions of the glass surface. Some pressure must be applied to deposit the metallic film on the glass which varies with the metal employed and the composition of the glass. Only slight pressure need be applied to mark soda-lime and flint glasses with titanium or zirconium. The metal is normally drawn across the glass with the two materials held in forcible surface-to-surface contact although the reverse is equally practicable with small glass articles. The markings do not scratch or otherside damage the glass surface so that the glass article is not weakened in the marked areas. The markings are normally very thin metallic films of relatively low porosity and experience has shown that a single gram of metal will normally cover several square meters of area. The thinness of the metallic deposit is usually less than a few thousandths inches to permit very economical marking.

It has been found that by heating the metallic markings on glass to suitable elevated temperatures a variety of color effects can be obtained. The various metallic elements deposited in films on glass develop particular colors when heated to certain temperature ranges. Developing the color effects of the metallic markings can be done by marking the glass surfaces at room temperature and then heating the same to the required temperature or by marking the glass surfaces already at an elevated temperature. The time required to develop the distinctive coloring of all the metallic films is relatively short and does not appear to be critical. The elevated temperatures cover relatively wide ranges generally below the annealing temperature of the glass.

The following table illustrates the colors developed by heating zirconium and titanium markings on glass in air through the temperature ranges indicated:

| Color | Temperature Range | |
|---|---|---|
| | Zirconium | Titanium |
| Metallic, silvery | Room Temp. to 200° C. | Room Temp. to 330° C. |
| Brownish (tarnished gold) | 200° C. to 330° C. | 330° C. to 450° C. |
| Blue | 330° C. to 390° C. | 450° C. to 490° C. |
| White, opaque | above 390° C. | above 490° C. |

The developed colors are clearly recognizable although they may be described as not especially vivid. Multicolored effects can be produced by marking the glass in the same or adjacent areas with different metals and heating the glass to certain temperatures. The color development of the metallic films appears to be generally the same on both soda-lime and borosilicate glass surfaces although minor differences in temperature range are known to exist. Depending upon the type of glass marked the temperature range is shifted slightly. The glass may be annealed at temperatures below which the colors are developed.

The distinguishable and distinctive colors of the metallic markings do not appear on the surfaces of pieces of the various metals when heated alone to similar temperature ranges shown in the table. Neither do the distinctive colors appear in the case of similar markings on vitreous silica heated to similar temperatures, although the markings do change to an opaque white at elevated temperatures.

Thus, it is clearly shown how certain colors may be developed by heating metallic markings on glass, particularly the elements of titanium and zirconium. The method may be performed with a minimum of apparatus by relatively unskilled hands at a nominal cost. It is important in marking the glass that the graduations, lettering or numerals be correct in their initial application because the markings are not easily removed. The markings can be removed by grinding the surface of the glass or by the application of hydrofluoric acid both of which roughen the surface. The markings can also be removed by hot concentrated sulphuric or phosphoric acids leaving the glass surface undamaged. The markings are highly resistant to the action of boiling water, boiling hydrochloric acid and boiling sodium hydroxide solutions which indicate their excellent adhesion and combination with the glass.

Various modifications may be resorted to within the spirit and scope of the appended claims.

We claim:

1. The method of decorating a clean glass surface with a distinctively colored adherent metallic film comprising the steps of physically contacting the glass surface and a marking element composed of titanium metal, effecting relative movement between said glass surface and said marking element while maintaining the two materials under compression to deposit an adherent metallic film of titanium on said surface where contacted, heating the coated glass surface to a predetermined critical temperature range to develop a desired coloration in said adherent film, said critical temperature range being from about 330° C. to 450° C. to develop a brownish color; and from above about 450° C. to 490° C. to develop a blue color; and cooling the decorated glass from the selected temperature range to atmospheric temperature to permanently retain the respective color developed thereon within said predetermined temperature range.

2. The method of decorating a clean glass surface with a distinctively colored adherent metallic film comprising the steps of physically contacting a glass surface and a marking element composed of zirconium metal, effecting relative movement between said glass surface and said marking element while maintaining the two materials under compression to deposit an adherent metallic film of zirconium on said surface where contacted, heating the coated glass surface to a predetermined critical temperature range to develop a desired coloration in said adherent film, said critical temperature range being from about 200° C. to 330° C. to develop a brownish color; and from above about 330° C. to 390° C. to develop a blue color; and cooling the decorated glass from the selected temperature range to atmospheric temperature to permanently retain the respective color developed thereon within said predetermined temperature range.

References Cited in the file of this patent

UNITED STATES PATENTS

| | | |
|---|---|---|
| 356,409 | Locke | Jan. 18, 1887 |
| 2,292,026 | Gillett | Aug. 4, 1942 |
| 2,418,804 | Hood | Apr. 8, 1947 |
| 2,641,672 | Parrish | June 9, 1953 |
| 2,662,035 | Levi | Dec. 8, 1953 |
| 2,667,431 | Burnside | Jan. 26, 1954 |
| 2,715,593 | Clark | Aug. 16, 1955 |

OTHER REFERENCES

Hammer: "Optik," vol. 3, pp. 496–497 (1948).

Miller: "Metallurgy of the Rarer Metals —2 Zirconium," pages 196–198 (1954).

Hammer: "Optik," vol. 3, page 495 (1948).

Hass: "Vacuum," vol. 2, page 331 (1952).

Belser: "Ceramic Age," pp. 17, 18, 20, 21 and 29, October 1953.

Belser: "The Review of Scientific Instruments," vol. 25, No. 9, pages 862–864, September 1954.